US012531916B2

(12) United States Patent
Li et al.

(10) Patent No.: US 12,531,916 B2
(45) Date of Patent: Jan. 20, 2026

(54) EMERGENCY CALL RELIABILITY AND SESSION RESPONSE TIME OPTIMIZATION THROUGH SUBSCRIPTION SELECTION

(71) Applicant: QUALCOMM Incorporated, San Diego, CA (US)

(72) Inventors: Zhiguo Li, Beijing (CN); Ronghui Lin, Shenzhen (CN); Nan Zhang, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 341 days.

(21) Appl. No.: 18/042,567

(22) PCT Filed: Oct. 28, 2020

(86) PCT No.: PCT/CN2020/124275
§ 371 (c)(1),
(2) Date: Feb. 22, 2023

(87) PCT Pub. No.: WO2022/087873
PCT Pub. Date: May 5, 2022

(65) Prior Publication Data
US 2023/0328120 A1    Oct. 12, 2023

(51) Int. Cl.
*H04L 65/1096* (2022.01)
*H04L 65/1016* (2022.01)
(Continued)

(52) U.S. Cl.
CPC ...... *H04L 65/1096* (2013.01); *H04L 65/1069* (2013.01); *H04M 3/5116* (2013.01);
(Continued)

(58) Field of Classification Search
CPC ............ H04L 65/1096; H04L 65/1069; H04M 3/5116
(Continued)

(56) References Cited

U.S. PATENT DOCUMENTS 11,039,297 B1 *   6/2021   Desai ..................... H04L 65/65
2014/0273974 A1   9/2014   Varghese et al.
(Continued)

FOREIGN PATENT DOCUMENTS

WO   2014144263   9/2014
WO   2016010658   1/2016
(Continued)

OTHER PUBLICATIONS

International Search Report and Written Opinion—PCT/CN2020/124275—ISAEPO—Jul. 19, 2021.

*Primary Examiner* — Maria El-Zoobi
(74) *Attorney, Agent, or Firm* — MUNCY, GEISSLER, OLDS & LOWE, P.C.

(57) ABSTRACT

A user equipment (UE) may be equipped with multiple subscriber identity modules (SIMS) capable of supporting emergency calls. When an emergency call is detected, the UE may send emergency call requests to a network through the multiple SIMS. The UE may handle the emergency call through whichever SIM that receives the earliest successful response from the network. By utilizing multiple SIMS to establish the emergency call, both reliability and session response time may be enhanced.

16 Claims, 6 Drawing Sheets

(51) Int. Cl.
   *H04L 65/1069* (2022.01)
   *H04M 3/51* (2006.01)
   *H04W 80/10* (2009.01)
   *H04W 88/06* (2009.01)

(52) U.S. Cl.
   CPC ......... *H04L 65/1016* (2013.01); *H04W 80/10* (2013.01); *H04W 88/06* (2013.01)

(58) Field of Classification Search
   USPC ..................................................... 455/404.1
   See application file for complete search history.

(56) References Cited

U.S. PATENT DOCUMENTS

| | | | |
|---|---|---|---|
| 2015/0141006 A1* | 5/2015 | Walke ..................... | H04W 8/18 455/434 |
| 2015/0312408 A1 | 10/2015 | Shi et al. | |
| 2016/0014578 A1* | 1/2016 | Kadiyala ................ | H04W 4/06 455/414.1 |
| 2016/0014579 A1* | 1/2016 | Kasilya Sudarsan ....................... | H04W 76/15 455/553.1 |
| 2016/0227025 A1* | 8/2016 | Soby ................... | H04M 19/042 |
| 2018/0139788 A1* | 5/2018 | Jhunjhunwala ....... | H04W 76/50 |
| 2020/0252779 A1* | 8/2020 | McFadden ........ | H04M 1/72424 |
| 2020/0304984 A1 | 9/2020 | Dhanapal et al. | |
| 2021/0235541 A1* | 7/2021 | Seol ..................... | H04W 76/50 |

FOREIGN PATENT DOCUMENTS

| | | | |
|---|---|---|---|
| WO | 2016078086 A1 | 5/2016 | |
| WO | 2020045952 A1 | 3/2020 | |

\* cited by examiner

EMERGENCY CALL RELIABILITY AND SESSION RESPONSE TIME OPTIMIZATION THROUGH SUBSCRIPTION SELECTION

The present application for patent claims priority to International Patent Application No. PCT/CN2020/124275, entitled "EMERGENCY CALL RELIABILITY AND SESSION RESPONSE TIME OPTIMIZATION THROUGH SUBSCRIPTION SELECTION," filed Oct. 28, 2020, which is assigned to the assignee hereof and is expressly incorporated herein by reference in its entirety.

TECHNICAL FIELD

Various aspects described herein generally relate to wireless communication systems, and more particularly, to emergency call reliability and session response time optimization, e.g., through subscription selection.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long-Term Evolution (LTE) or Worldwide Interoperability for Microwave Access (WiMAX)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments.

5G New Radio (NR) connectivity, or simply NR connectivity, has gained significant commercial traction in recent time. Thus, to attract more users to their network, network operators would like to show NR connectivity to users most of the time on the user interface (UI) of the mobile device such as the user equipment (UE).

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. 5G New Radio (NR) connectivity, or simply NR connectivity, has gained significant commercial traction in recent time.

Emergency call is one very important service in 5G NR. An important key performance indicator (KPI) of an emergency call is response time. Generally, faster response times correlate with security of the caller. Emergency reliability is another significant factor. It is thus desirable to enhance response times and/or reliability of emergency calls.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An exemplary user equipment (UE) is disclosed. The UE may comprise a processor, a memory, and a transceiver. The processor may be configured to send first and second emergency call (e-call) requests in parallel to a network through first and second subscriber identity modules (SIMS) of the UE, respectively. The processor may also be configured to receive first and second e-call success responses through the first and second SIMS, respectively, from the network. The first e-call success response may indicate that an e-call connection has been successfully established through the first SIM. The second e-call success response may indicate that an e-call connection has been successfully established through the second SIM. The processor may further be configured to handle an e-call through the first SIM when the processor determines that the first e-call success response is received earliest. The processor may yet be configured to handle the e-call through the second SIM when the processor determines that the second e-call success response is received earliest.

An exemplary method performed by a user equipment (UE) is disclosed. The method may comprise sending first and second emergency call (e-call) requests in parallel to a network through first and second subscriber identity modules (SIMS) of the UE, respectively. The method may also comprise receiving first and second e-call success responses through the first and second SIMS, respectively, from the network. The first e-call success response may indicate that an e-call connection has been successfully established through the first SIM. The second e-call success response may indicate that an e-call connection has been successfully established through the second SIM. The method may further comprise handling an e-call through the first SIM when it is determined that the first e-call success response is received earliest. The method may yet comprise handling the e-call through the second SIM when it is determined that the second e-call success response is received earliest.

Another exemplary user equipment (UE) is disclosed. The UE may comprise means for sending first and second emergency call (e-call) requests in parallel to a network through first and second subscriber identity modules (SIMs) of the UE, respectively. The UE may also comprise means for receiving first and second e-call success responses through the first and second SIMs, respectively, from the network. The first e-call success response may indicate that an e-call connection has been successfully established through the first SIM. The second e-call success response may indicate that an e-call connection has been successfully established through the second SIM. The UE may further comprise means for handling an e-call through the first SIM when the UE determines that the first e-call success response is received earliest. The UE may yet comprise means for handling the e-call through the second SIM when the UE determines that the second e-call success response is received earliest.

A non-transitory computer-readable medium storing computer-executable instructions for a user equipment (UE) is disclosed. The executable instructions may comprise one or more instructions instructing the UE to send first and second emergency call (e-call) requests in parallel to a network through first and second subscriber identity modules (SIMs) of the UE, respectively. The executable instructions may also comprise one or more instructions instructing the UE to receive first and second e-call success responses through the first and second SIMS, respectively, from the network. The first e-call success response may indicate that an e-call connection has been successfully established through the first SIM. The second e-call success response may indicate that an e-call connection has been successfully established through the second SIM. The executable instructions may further comprise one or more instructions instructing the UE to handle an e-call through the first SIM when the UE determines that the first e-call success response is received earliest. The executable instructions may yet comprise one or more instructions instructing the UE to handle the e-call through the second SIM when the UE determines that the second e-call success response is received earliest.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
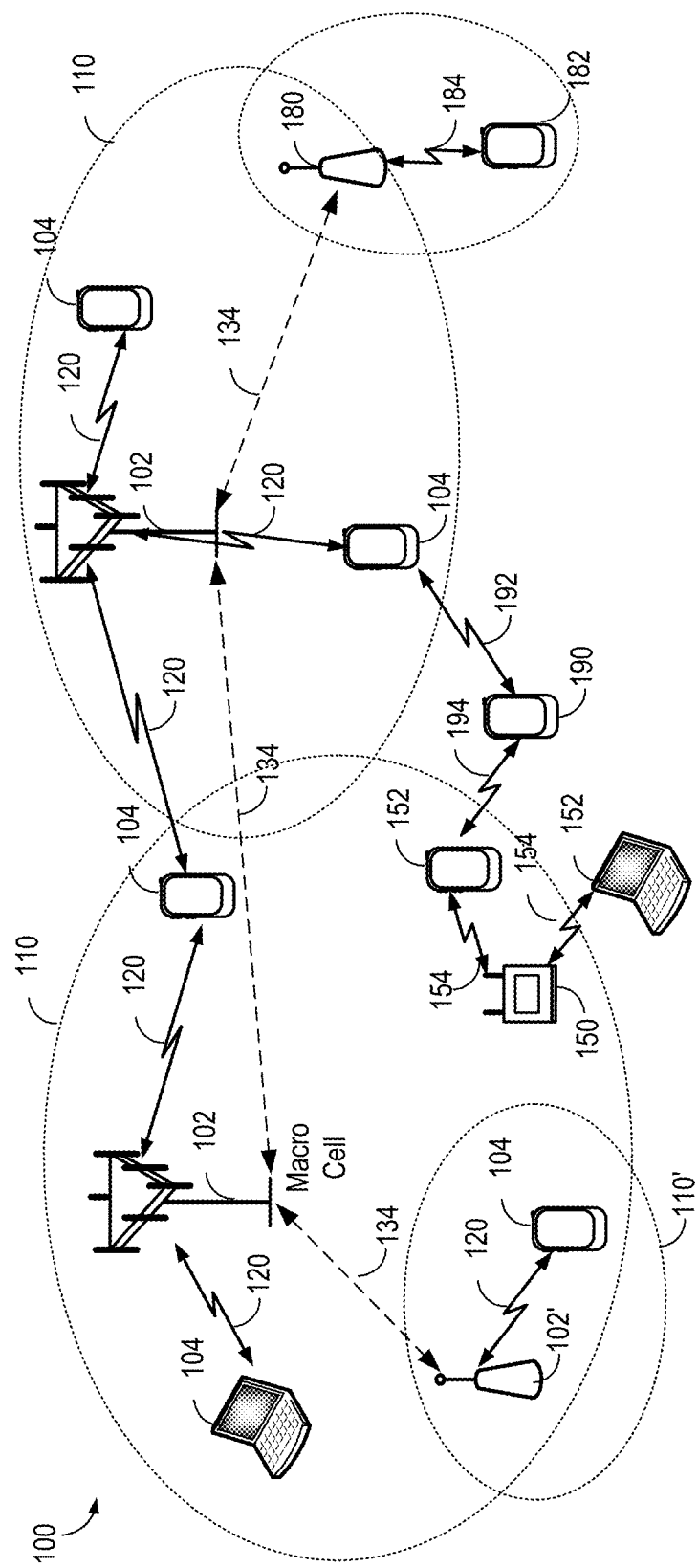
FIG. 1 illustrates an exemplary wireless communications system in accordance with one or more aspects of the disclosure.

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, terms "user equipment" (UE) and "base station" are not intended to be specific or otherwise limited to any particular Radio Access Technology (RAT), unless otherwise noted. In general, UEs may be any wireless communication device (e.g., mobile phone, router, tablet computer, laptop computer, tracking device, Internet of Things (IoT) device, etc.) used by user to communicate over wireless communications network. UE may be mobile or may (e.g., at certain times) be stationary, and may communicate with Radio Access Network (RAN). As used herein, "UE" may be referred to interchangeably as "access terminal" or "AT," "client device," "wireless device," "subscriber device," "subscriber terminal," "subscriber station," "user terminal" UT, "mobile terminal," "mobile station," or variations thereof. Generally, UEs can communicate with core network via RAN, and through the core network the UEs can be connected with external networks such as Internet and with other UEs. Of course, other mechanisms of connecting to core network and/or the Internet are also possible for UEs, such as over wired access networks, WiFi networks (e.g., based on Institute of Electrical and Electronics Engineers (IEEE) 802.11, etc.) and so on.

Base station may operate according to one of several RATs in communication with UEs depending on the network in which it is deployed, and may be alternatively referred to as Access Point (AP), Network Node, NodeB, evolved NodeB (eNB, eNodeB), general Node B (gNB, gNodeB), etc. In addition, in some systems base station may provide edge node signaling functions, while in other systems it may provide additional control and/or network management functions.

UEs can be embodied by any of a number of device types including but not limited to printed circuit (PC) cards, compact flash devices, external or internal modems, wireless or wireline phones, smartphones, tablets, tracking devices, asset tags, and so on. Communication link through which UEs can send signals to RAN may be referred to as uplink (UL) channel (e.g., reverse traffic channel, reverse control channel, access channel, etc.). Communication link through which RAN can send signals to UEs may be referred to as downlink (DL) or forward link channel (e.g., paging channel, control channel, broadcast channel, forward traffic channel, etc.). As used herein, term traffic channel (TCH) can refer to either a UL/reverse or DL/forward traffic channel.

FIG. 1 illustrates an exemplary wireless communications system 100 according to one or more aspects. The wireless communications system 100, which may also be referred to as a wireless wide area network (WWAN), may include various base stations 102 and various UEs 104. The base stations 102 may include macro cells (high power cellular base stations) and/or small cells (low power cellular base stations). The macro cells may include eNBs where the wireless communications system 100 corresponds to an Long-Term Evolution (LTE) network, gNBs where the wireless communications system 100 corresponds to a 5G network, and/or a combination thereof. Small cells may include femtocells, picocells, microcells, etc.

The base stations 102 may collectively form a RAN and interface with an Evolved Packet Core (EPC) or Next Generation Core (NGC) through backhaul links. The base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each base station 102 may provide communication coverage for a respective geographic coverage area 110. In an aspect, although not shown in FIG. 1, coverage areas 110 may be subdivided into a plurality of cells (e.g., three), or sectors, each cell corresponding to a single antenna or array of antennas of a base station 102. As used herein, "cell" or "sector" may correspond to one of a plurality of cells of a base station 102, or to the base station 102 itself, depending on the context.

While neighbor macro cell geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cells may be known as a heterogeneous network. A heterogeneous network may also include Home eNBs (HeNBs) and/or Home gNBs, which may provide service to a restricted group known as a closed subscriber group (CSG). The communication links 120 between the base stations 102 and the UEs 104 may include UL/reverse link transmissions from a UE 104 to a base station 102 and/or DL/forward link transmissions from a base station 102 to a UE 104. The communication links 120 may use multiple input multiple output (MIMO) antenna technology, including spatial multiplexing, beamforming, and/or transmit diversity. The communication links 120 may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating determine whether the channel is available.

The small cell base station 102' may operate in a licensed and/or in an unlicensed frequency spectrum. When operating in an unlicensed frequency spectrum, the small cell base station 102' may employ 4G (e.g., LTE) or 5G (e.g., NR) technology and use the same 5 GHz unlicensed frequency spectrum used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the radio frequency (RF) range in the electromagnetic spectrum. EHF has a frequency range between 30 and 300 GHz and a wavelength between 1 and 10 mm. Radio waves in this band may be referred to as a millimeter wave. Near mmW may extend down to a frequency of 3 GHz with a wavelength of 100 mm. Super high frequency (SHF) band extends between 3 GHz and 30 GHz, also referred to as centimeter wave. Communications using the mmW and/or near mmW radio frequency bands typically have high path loss and a relatively short range. The mmW base station 180 may utilize beamforming 184 with the UE 182 to compensate for the high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D RAT, such as LTE Direct (LTE-D), WiFi Direct (WiFi-D), Bluetooth, and so on. Any of the base stations 102, 102', 180 may send measurement requests (e.g., measurement control order (MCO)) to the UEs 104, 182, 190, and the UE's 104, 182, 190 may respond with measurement reports accordingly.

Figure 2:
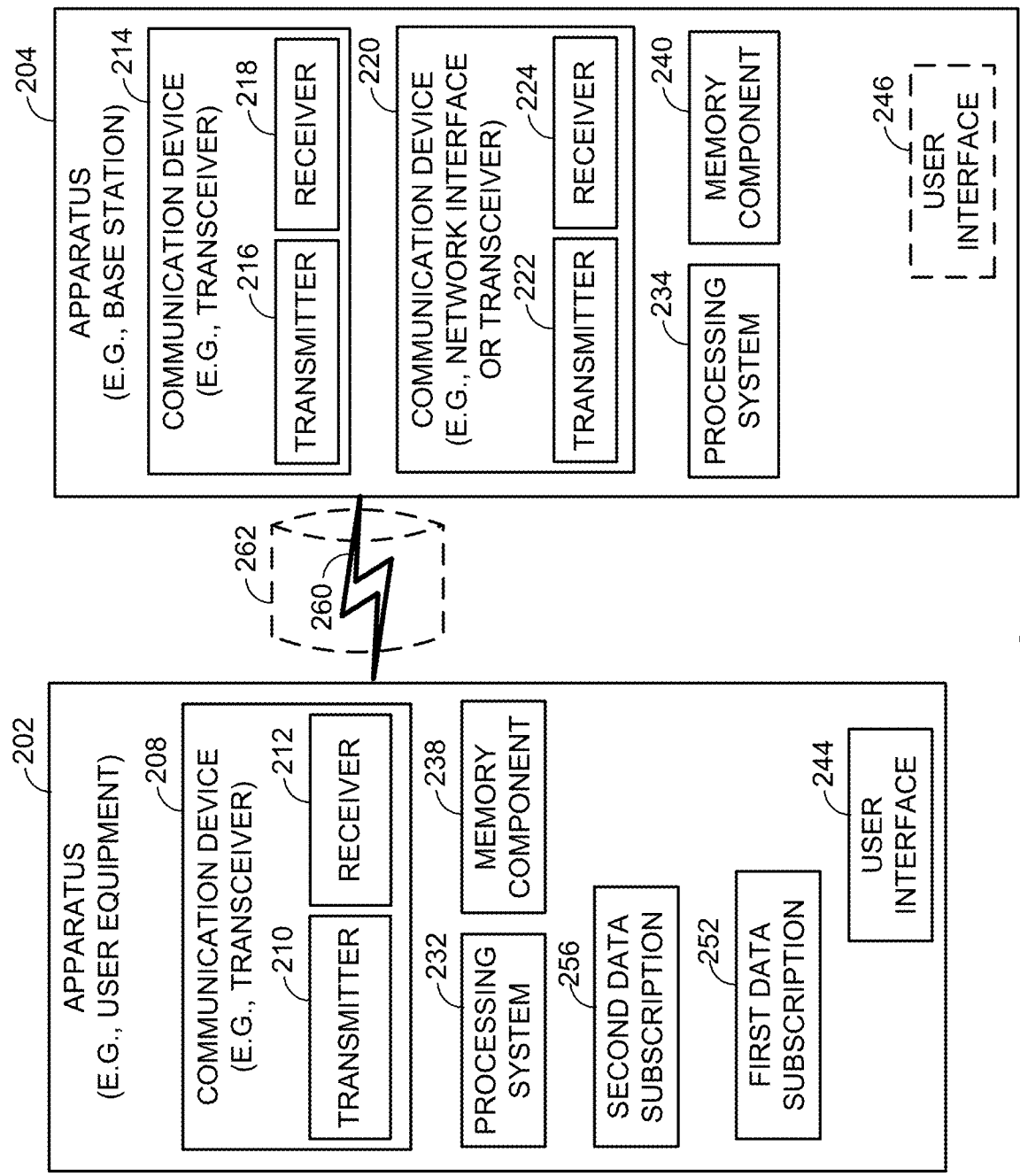
FIG. 2 is a simplified block diagram of several sample aspects of components that may be employed in wireless communication nodes and configured to support communication in accordance with one or more aspects of the disclosure.

FIG. 2 illustrates several sample components (represented by corresponding blocks) that may be incorporated into an apparatus 202 and an apparatus 204 (corresponding to, for example, a UE and a base station (e.g., eNB, gNB), respectively, to support the operations as disclosed herein. As an example, the apparatus 202 may correspond to a UE, and the apparatus 204 may correspond to a network node such as a gNB and/or an eNB. It will be appreciated that the components may be implemented in different types of apparatuses in different implementations (e.g., in an ASIC, in a System-on-Chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 202 and the apparatus 204 each may include at least one wireless communication device (represented by communication devices 208 and 214) for communicating with other nodes via at least one designated RAT (e.g., LTE, NR, etc.). The communication device 208 may include at least one transmitter (represented by transmitter 210) for transmitting and encoding signals (e.g., messages, indications, information, and so on) and at least one receiver (represented by receiver 212) for receiving and decoding signals (e.g., messages, indications, information, pilots, and so on). The communication device 214 may include at least one transmitter (represented by transmitter 216) for transmitting signals (e.g., messages, indications, information, pilots, and so on) and at least one receiver (represented by receiver 218) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include a plurality of antennas, such as an antenna array, that permits the respective apparatus to perform transmit "beamforming," as described further herein. Similarly, a receiver may include a plurality of antennas, such as an antenna array, that permits the respective apparatus to perform receive beamforming, as described further herein. In an aspect, the transmitter and receiver may share the same plurality of antennas, such that the respective apparatus can only receive or transmit at a given time, not both at the same time. A wireless communication device (e.g., one of multiple wireless communication devices) of the apparatus 204 may also comprise a Network Listen Module (NLM) or the like for performing various measurements.

The apparatus 204 may include at least one communication device (represented by the communication device 220) for communicating with other nodes. For example, the communication device 220 may comprise a network interface (e.g., one or more network access ports) configured to communicate with one or more network entities via a wire-based or wireless backhaul connection. In some aspects, the communication device 220 may be implemented as a transceiver configured to support wire-based or wireless signal communication. This communication may involve, for example, sending and receiving messages, parameters, or other types of information. Accordingly, in the example of FIG. 2, the communication device 220 is shown as comprising transmitter 222 and receiver 224 (e.g., network access ports for transmitting and receiving).

The apparatuses 202 and 204 may also include other components used in conjunction with the operations as disclosed herein. The apparatus 202 may include a processing system 232 for providing functionality relating to, for example, communication with the network. The apparatus 204 may include a processing system 234 for providing functionality relating to, for example, communication with the UEs. In an aspect, the processing systems 232 and 234 may include, for example, one or more general purpose processors, multi-core processors, ASICs, digital signal processors (DSPs), field programmable gate arrays (FPGA), or other programmable logic devices or processing circuitry.

The apparatus 202 may include first and second data subscriptions (e.g., subscriber identify modules (SIMs)) 252 and 256 that may be associated with providing services in different radio access technologies (e.g., 4G LTE, 5G NR).

The apparatuses 202 and 204 may include memory components 238 and 240 (e.g., each including one or more memory devices), respectively, for maintaining information (e.g., information indicative of reserved resources, thresholds, parameters, and so on). In various implementations, the memory component 238 can comprise a computer-readable medium storing one or more computer-executable instructions where the one or more instructions instruct apparatus 202 (e.g., processing system 232 in combination with communications device 208 and/or other aspects of apparatus 202) to perform any of the functions described herein. In various implementations, the memory component 240 can comprise a computer-readable medium storing one or more computer-executable instructions where the one or more instructions instruct apparatus 204 (e.g., processing system 234 in combination with communications devices 214, 220 and/or other aspects of apparatus 204) to perform any of the functions described herein. In addition, the apparatuses 202 and 204 may include user interface devices 244 and 246, respectively, for providing indications (e.g., audible and/or visual indications) to a user and/or for receiving user input (e.g., upon user actuation of a sensing device such a keypad, a touch screen, a microphone, and so on).

For convenience, the apparatuses 202 and 204 are shown in FIG. 2 as including various components that may be configured according to the various examples described herein. It will be appreciated, however, that the illustrated blocks may have different functionality in different designs. The components of FIG. 2 may be implemented in various ways. In some implementations, the components of FIG. 2 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 208, 232, 238, and 244 may be implemented by processor and memory component(s) of the apparatus 202 (e.g., by execution of appropriate code and/or by appropriate configuration of processor components). Similarly, some or all of the functionality represented by blocks 214, 220, 234, 240, and 246 may be implemented by processor and memory component(s) of the apparatus 204 (e.g., by execution of appropriate code and/or by appropriate configuration of processor components).

In an aspect, the apparatus 204 may correspond to a "small cell" or a Home gNB. The apparatus 202 may transmit and receive messages via a wireless link 260 with the apparatus 204, the messages including information related to various types of communication (e.g., voice, data, multimedia services, associated control signaling, etc.). The wireless link 260 may operate over a communication medium of interest, shown by way of example in FIG. 2 as the medium 262, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the apparatus 204 and the apparatus 202 for the medium 262.

In general, the apparatus 202 and the apparatus 204 may operate via the wireless link 260 according to one or more radio access types, such as LTE, LTE-U, NR, etc. depending on the network in which they are deployed. These networks may include, for example, different variants of CDMA networks (e.g., LTE networks, NR networks, etc.), TDMA networks, FDMA networks, Orthogonal FDMA (OFDMA) networks, Single-Carrier FDMA (SC-FDMA) networks, and so on.

A UE may be capable of operating in multiple radio access technologies (RATs). For example, a UE may be capable of operating in a first RAT (e.g., NR) and in a second RAT (e.g., LTE). These are merely examples, and first and second RATs may be any of the RATs currently known (e.g., WiMAX, CDMA, WCDMA, UTRA, Evolved Universal Terrestrial Radio Access (E-UTRA), GSM, FDMA, GSM, TDMA, etc.).

Also, a UE may be capable of operating in multiple RATs at the same time. For example, a UE that can operate in both LTE and NR simultaneously is an E-UTRA-NR Dual Connectivity (ENDC) capable UE. Note that ENDC is an example of Multi-RAT DC (MRDC) capability. In general, when an MRDC capable UE is operating in two RATs, it may be communicating with base stations of the two RATs. For example, when the UE operates in the first RAT (e.g., NR), it may communicate with a network node (e.g., gNB) of the first RAT. Similarly, when the UE operates in the second RAT (e.g., LTE), it may communicate with a network node (e.g., eNB) of the second RAT.

The UE may be capable of operating in a standalone (SA) or in a non-standalone (NSA) mode within a given RAT. When operating in the SA mode, the UE may exchange both control and data plane (also referred to as user plane) information with the network node and/or the core network of the given RAT (e.g., NR). When operating in the NSA mode, the UE may communicate with network nodes of the first and second RATs. In the NSA mode, the UE may exchange data plane information with the network nodes of both the first RAT (e.g., NR) and the second RAT (e.g., LTE). However, the control plane information may be exchanged only with the network node of the second RAT (e.g., LTE).

A UE may be configured such that it can be equipped with multiple subscriptions—e.g., default data subscription (DDS) and non-DDS. For example, multiple subscriber identity modules (SIMS) may be inserted in the UE. As indicated, the UE may also be capable of operating in multiple RATS. The DDS (e.g., primary SIM) may be registered or otherwise configured for operation in one RAT (e.g., 5G NR) and the non-DDS (secondary SIM) may be registered or otherwise configured for operation in the same one RAT and/or in another RAT (e.g., 4G LTE).

As indicated above, emergency call is an important service in wireless networks such as LTE and NR networks. An important key performance indicator (KPI) of an emergency call is response time. Generally, faster response times correlate with security of the caller. Reliability is another significant factor. It is thus desirable to enhance response times and/or reliability of emergency calls.

Conventionally, in a multiple subscription UE, emergency call (e-call) is typically handled through one subscription, e.g., through the DDS (i.e., through the primary SIM). However, relying on one subscription for may not provide the desired emergency call reliabilities. To address such issues, in a multiple subscription UE, it is proposed to leverage the multiple SIMS by initiating the e-call through the multiple SIMS. In this way, both reliability and response times may be enhanced.

Figure 3:
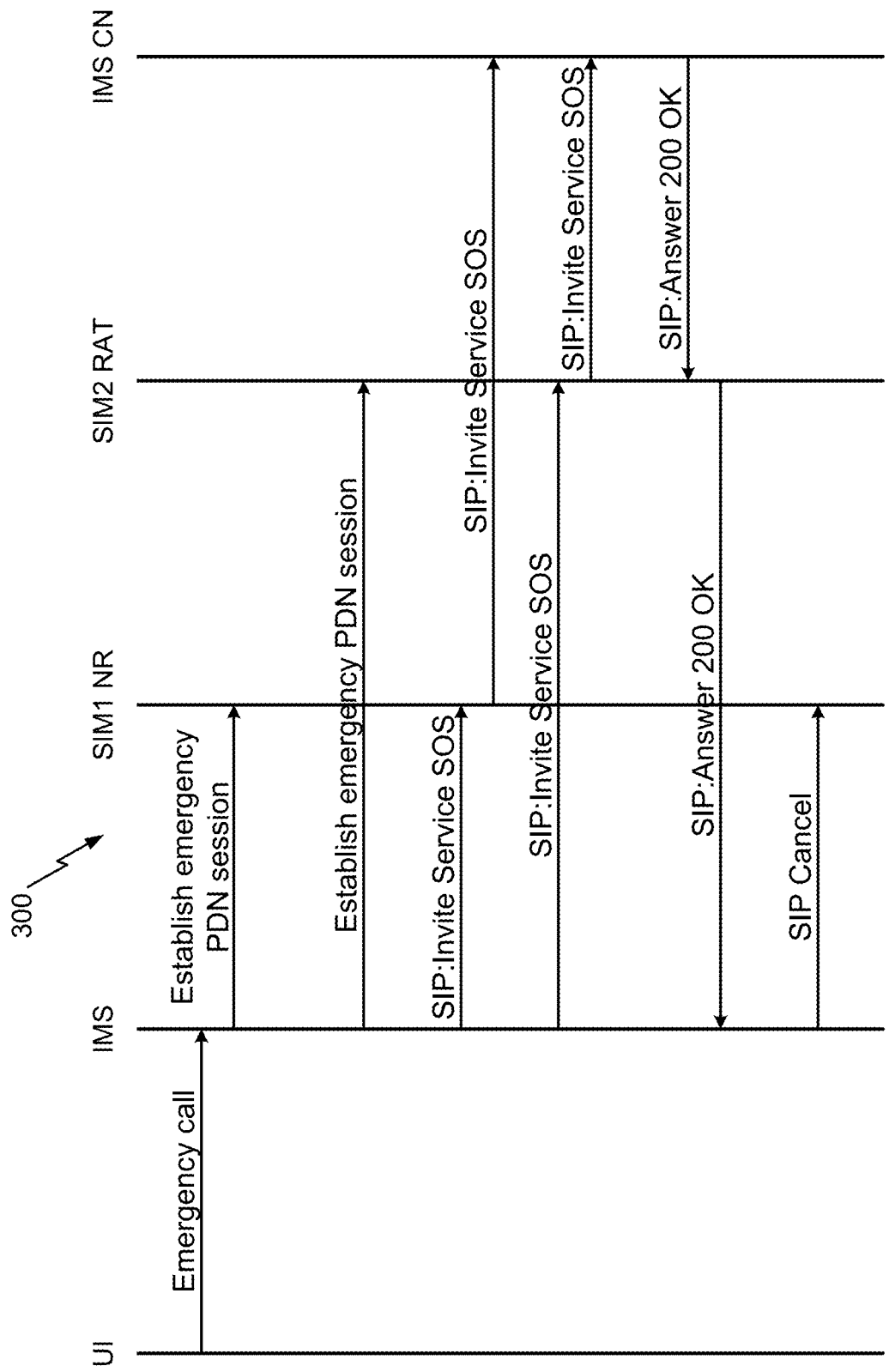
FIG. 3 illustrates a flow of an example scenario that shows a technique for emergency calling in accordance with one or more aspects of the disclosure.

FIG. 3 a flow of an example scenario 300 in which a proposed technique is implemented. In FIG. 3, it may be assumed that the UE is equipped with multiple subscriptions (i.e., multiple SIMS) capable of supporting emergency call services. The flow may proceed when an e-call is triggered. For example, the user may initiate the e-call on the UI of the UE.

When the e-call is triggered, the UE may establish multiple internet protocol (IP) multimedia subsystem (IMS) emergency packet data network (PDN) sessions through corresponding multiple SIMS configured to support e-call services. For example, the UE may establish a first IMS emergency PDN session through a first SIM (e.g., SIM1), and establish a second IMS emergency PDN session through a second SIM (e.g., SIM2). The first SIM may be registered for operation in a first RAT (e.g., NR) and the second SIM may be registered for operation in the first RAT and/or in a second RAT (e.g., LTE).

The UE through the first SIM may send a first IMS e-call request to the network. For example, the first SIM may send a "SIP:Invite Service SOS" message to the IMS CN using the first IMS emergency PDN session. Also, the UE through the second SIM may send a second IMS e-call request to the network. For example, the second SIM may send another "SIP:Invite Service SOS" message to the IMS CN, this time using the second IMS emergency PDN session. The first and second IMS e-call requests may be sent in parallel. That is, both IMS e-call requests made to the network may be in effect at the same time.

Subsequently, the UE may receive one or more IMS successful responses from the network. For example, the first SIM may receive a "SIP:Answer 200 OK" response from the IMN CN indicating that an e-call connection has been successfully established in response to the first IMS e-call request. Alternatively or in addition thereto, the second SIM may receive the "SIP:Answer 200 OK" response from the IMN CN indicating that the e-call connection has been successfully established in response to the second IMS e-call request.

In FIG. 3, it may be assumed that the second SIM receives the successful response ahead of the first SIM receiving the successful response. Under this circumstance, the UE may handle the e-call through the second SIM and cancel the e-call request made via the first SIM. While not shown, if the first SIM had received the successful response from the IMS CN ahead of the second SIM, then the UE may handle the e-call via the first SIM and cancel the e-call request made via the second SIM. Generally, the UE may handle the e-call through the SIM that receives the earliest successful response and cancel the remaining e-call requests.

Figure 4:
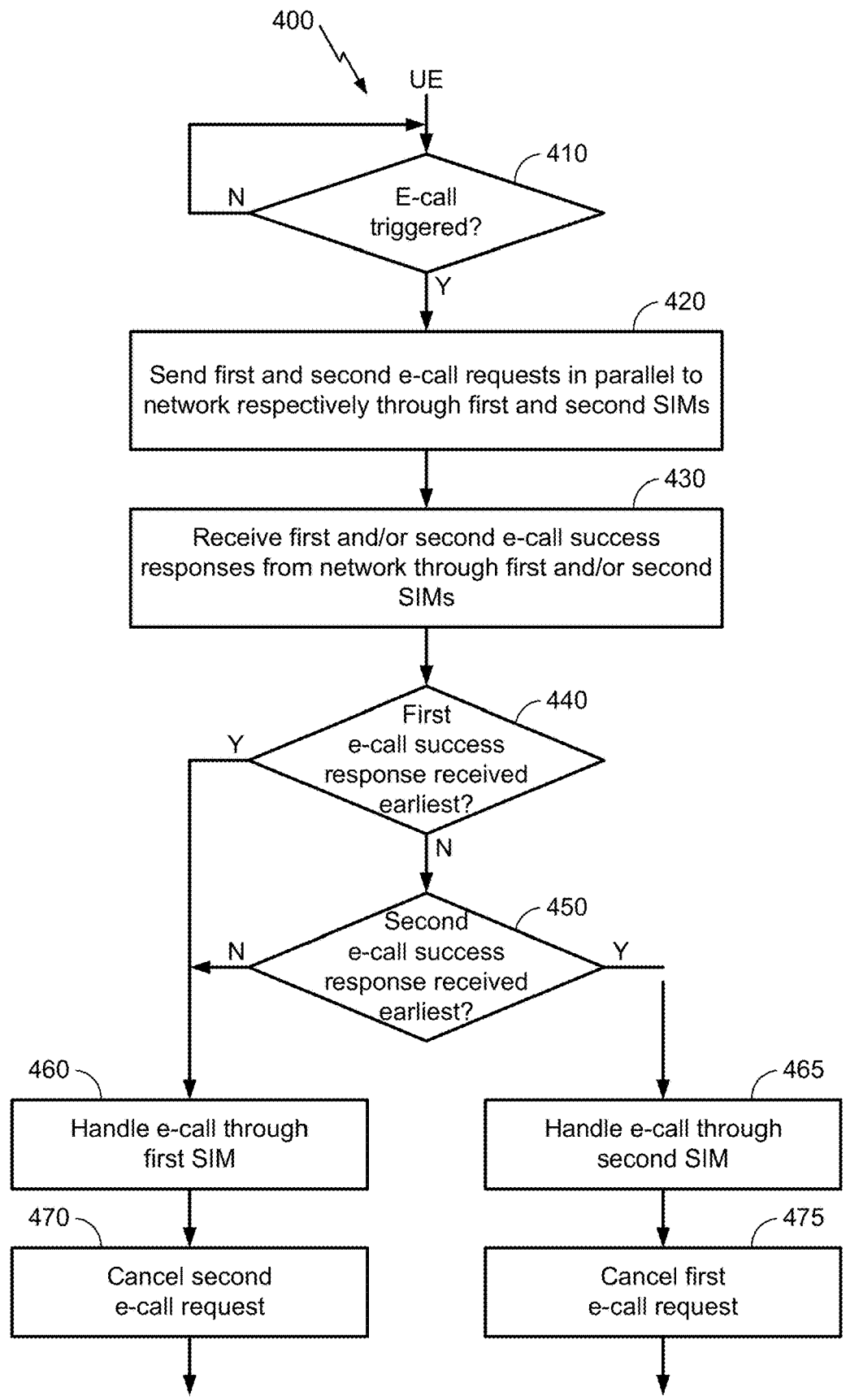
FIGS. 4-5 illustrate flow charts of an exemplary method performed by a user equipment for emergency calling in accordance with one or more aspects of the disclosure.

FIG. 4 illustrates a flow chart of an exemplary method performed by a UE, e.g., for emergency calling. FIG. 4 may be viewed as a generalization of the flow of FIG. 3. Here, the UE (such as the UE 202) may be capable of operating in one or more RATs such as 4G LTE and 5G NR. The UE may be assumed to be a multi SIM UE comprising at least first and second SIMs capable of supporting emergency calls. The memory component 238 may be viewed as an example of a non-transitory computer-readable medium that stores computer-executable instructions to operate components of the UE 202 such as the transceiver 208 (including transmitter 210 and receiver 212), the processing system 232 (including one or more processors), memory component 238, and so on.

The following should be noted. For explanation purposes, how to select between first and second SIMs is discussed. However, this is merely for ease of description. The concepts disclosed herein readily encompass circumstances in which the UE may be equipped with any number of SIMs capable of supporting emergency calls.

In block 410, the UE may detect that an e-call has been triggered. For example, a user of the UE may have initiated the e-call using the user interface 244.

Upon detection of the e-call trigger ("Y" branch from block 410), the UE in block 420 may send first and second e-call requests in parallel to a network respectively through the first and SIMs. For example, the first e-call request may be sent to the network (e.g., to IMS CN) through the first SIM, and the second e-call request may be sent to the network through the second SIM. The first SIM may be registered for operation in a first RAT (e.g., 5G NR). The second SIM may be registered for operation in the same first RAT. Alternatively, the second SIM may be registered for operation in a second RAT (e.g., 4G LTE).

Figure 5:
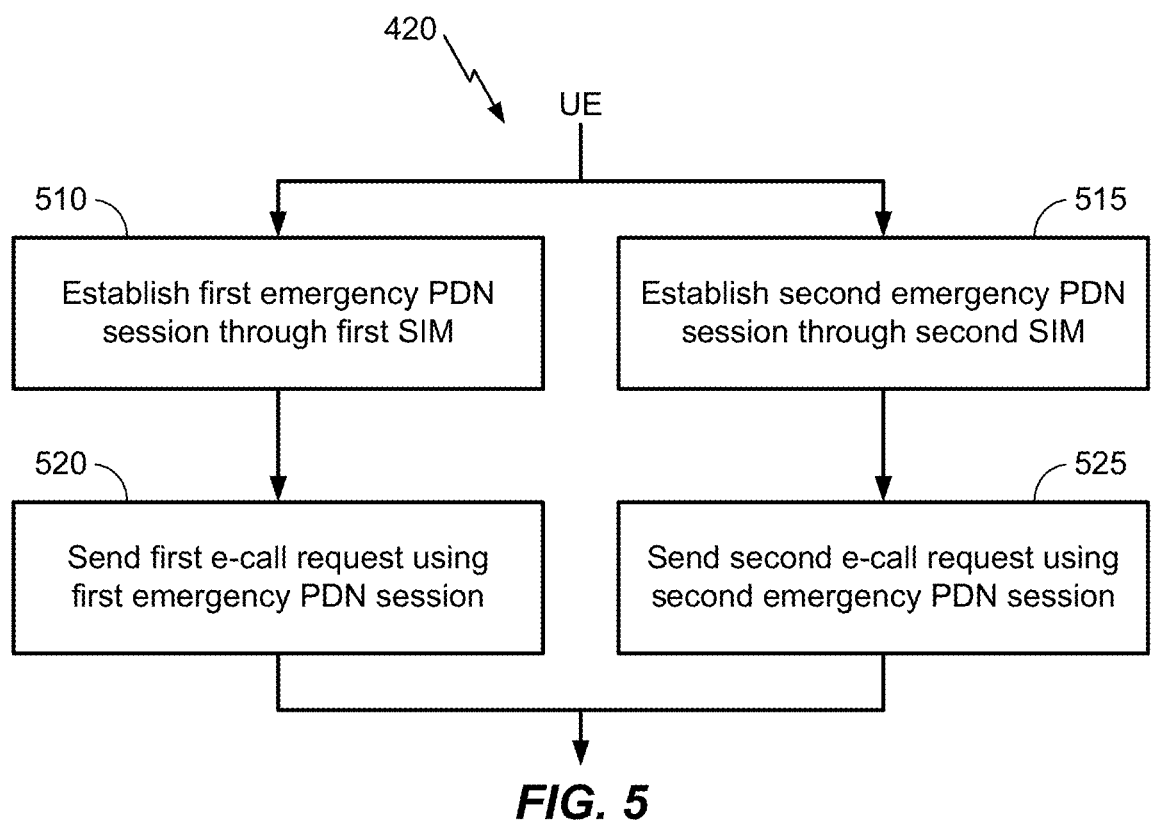

FIG. 5 illustrates a flowchart of a process performed by the UE to implement block 420. In block 510, the UE may establish a first emergency PDN session through the first SIM, and in block 515, the UE may establish a second emergency PDN session through the second SIM.

In block 520, the UE may send the first e-call request using the first emergency PDN session, and in block 525, the UE may send the second e-call request using the second emergency PDN session.

In an aspect, the first and/or the second emergency PDN session may be first and second IMS emergency PDN sessions. Also, the first and/or the second e-call requests may be IMS requests. For example, the first and/or the second e-call requests may be SIP invite messages specifying emergency (e.g., first and second "SIP:Invite Service SOS" messages).

Note that in FIG. 5, establishing the first emergency PDN session and sending the first e-call request (blocks 510, 520) are differently branched from establishing the second emergency PDN session and sending the second e-call request (blocks 515, 525). This is to visually emphasize that the first and second e-call requests may be sent in parallel.

When two messages are sent in "parallel", it is not required that the two messages be sent at the same time (although that can be one of the options) for them to be sent in parallel. It is entirely possible that the two messages be sent at different times, i.e., the first e-call request may be sent followed by the second e-call request or vice versa and still be sent in parallel.

In an aspect, being sent in parallel may imply that both messages are in effect when the latter message is sent. One way to send messages in parallel is to send the latter message without waiting on whether the former message has or has not been accepted, e.g., by the network. That is, the first e-call request may be sent without waiting for a response to the second e-call request and/or the second e-call request may be sent without waiting for a response to the first e-call request.

Referring back to FIG. 4, in block 430, the UE may receive first and/or second e-call success responses from the network (e.g., IMS CN). That is, the first e-call success response may be received but not the second, the second e-call success response may be received but not the first, or both the first and second e-call success responses may both be received. Means for performing block 430 may include the transceiver 208, the processing system 232, and/or the memory component 238 of the UE 202.

The first e-call success response corresponding to the first e-call request may be received through the first SIM, and/or the second e-call success response corresponding to the second e-call request may be received through the second SIM. When received, the first e-call success response may indicate that an e-call connection has been successfully established through the first SIM. Likewise, when received, the second e-call success response may indicate that an e-call connection has been successfully established through the second SIM.

In an aspect, the first and/or the second e-call success responses may correspondingly be first and/or second IMS responses. For example, the first and/or the second e-call success responses may be first and second SIP OK messages (e.g., first and second "SIP:Answer 200 OK" messages).

In block 440, the UE may determine whether the first e-call success response was received before the second e-call success response was received, i.e., whether the first e-call success response is received the earliest. If not ("N" branch from block 440), in block 450, the UE may determine whether the second e-call success response was received before the first e-call success response was received, i.e., whether the second e-call success response is received the earliest.

In an aspect, if the first e-call success response is received but the second is not, then in block 440, this may also be counted as having received the first e-call success response earliest. Similarly, if the second e-call success response is received but the first is not, then in block 450, this may also be counted as having received the second e-call success response earliest. In other words, the UE need NOT wait for responses to both the first and second e-call requests. The UE may proceed as soon as it receives one response.

If the first e-call success response is received the earliest ("Y" branch from block 440), then in block 460, the UE may handle the e-call through the first SIM. Also, in block 470, the UE may cancel the second e-call request, e.g., by sending a SIP cancel message.

On the other hand, if the second e-call success response is received the earliest ("Y" branch from block 450), then in block 465, the UE may handle the e-call through the second SIM. Also, in block 477, the UE may cancel the first e-call request, e.g., by sending a SIP cancel message.

In general, the UE may handle the e-call through the SIM corresponding to the earliest received e-call success response, and cancel the remaining e-call requests.

Figure 6:
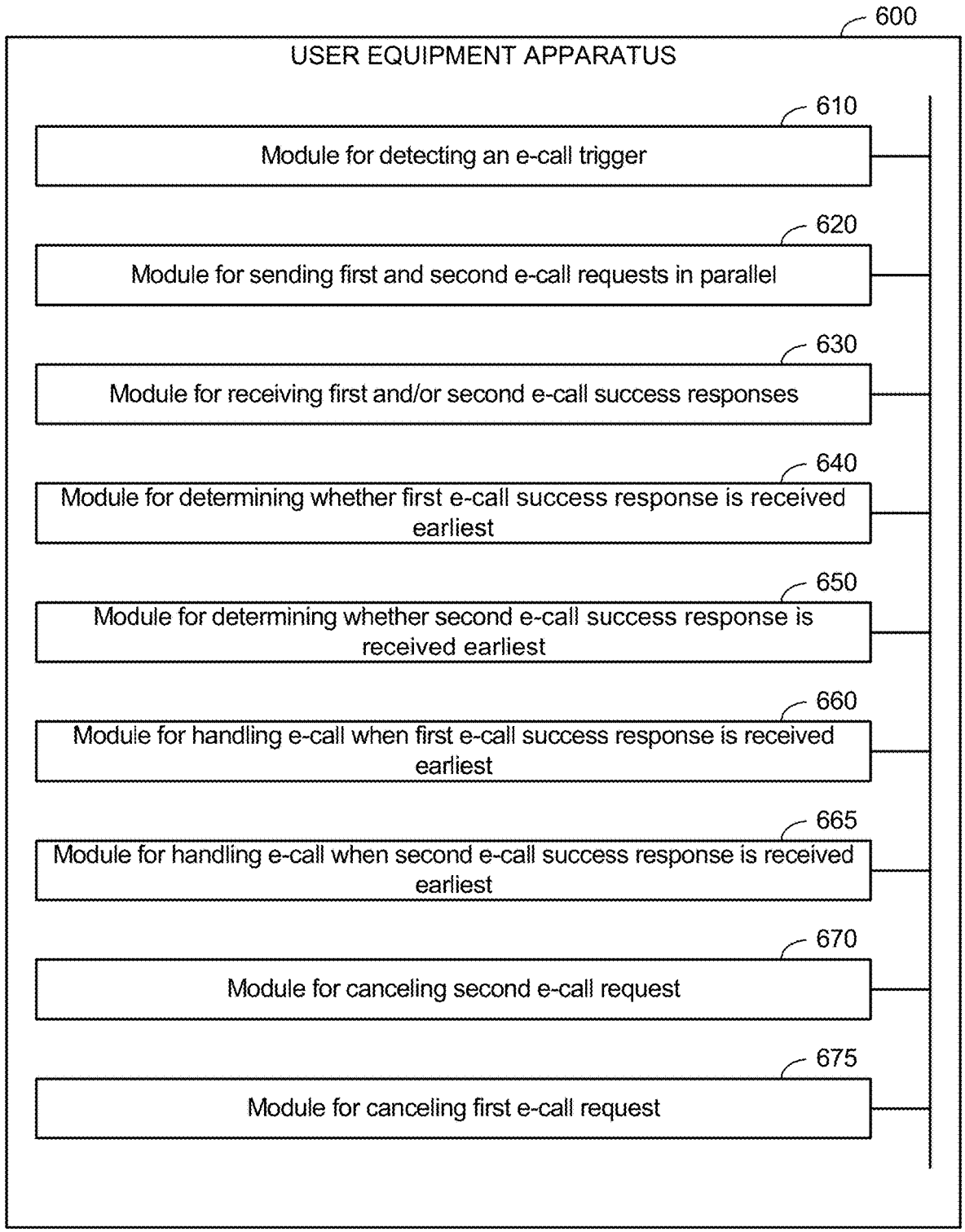
FIG. 6 illustrates a simplified block diagram of several sample aspects of a user equipment apparatus configured for emergency calling in accordance with one or more aspects of the disclosure.

FIG. 6 illustrates an example user equipment apparatus 600 represented as a series of interrelated functional modules connected by a common bus. Each of the modules may be implemented in hardware or as a combination of hardware and software. For example, the modules may be implemented as any combination of the modules of the apparatus 202 of FIG. 2. A module for determining detecting an e-call trigger 610 may correspond at least in some aspects to a user interface (e.g., user interface 244), a processing system (e.g., processing system 232) and/or a memory component (e.g., memory component 238). A module for sending first and second e-call requests in parallel 620 may correspond at least in some aspects to a communication device (e.g., transceiver 208), a first SIM (e.g., first data subscription 252), a second SIM (e.g., second data subscription), a processing system (e.g., processing system 232) and/or a memory component (e.g., memory component 238). A module for receiving first and/or second e-call responses 630 may correspond at least in some aspects to a communication device (e.g., transceiver 208), a first SIM (e.g., first data subscription 252), a second SIM (e.g., second data subscription), a processing system (e.g., processing system 232) and/or a memory component (e.g., memory component 238). A module for determining whether first e-call success response is received earliest 640 may correspond at least in some aspects to a processing system (e.g., processing system 232) and/or a memory component (e.g., memory component 238). A module for determining whether second e-call success response is received earliest 650 may correspond at least in some aspects to a processing system (e.g., processing system 232) and/or a memory component (e.g., memory component 238). A module for handling e-call when the first e-call success response is received earliest 660 may correspond at least in some aspects to a communication device (e.g., transceiver 208), a first SIM (e.g., first data subscription 252), a processing system (e.g., processing system 232) and/or a memory component (e.g., memory component 238). A module for handling e-call when the second e-call success response is received earliest 665 may correspond at least in some aspects to a communication device (e.g., transceiver 208), a second SIM (e.g., second data subscription 254), a processing system (e.g., processing system 232) and/or a memory component (e.g., memory component 238). A module for canceling second e-call request 670 may correspond at least in some aspects to a communication device (e.g., transceiver 208), a second SIM (e.g., second data subscription 254), a processing system (e.g., processing system 232) and/or a memory component (e.g., memory component 238). A module for canceling first e-call request 675 may correspond at least in some aspects to a communication device (e.g., transceiver 208), a first SIM (e.g., first data subscription 252), a processing system (e.g., processing system 232) and/or a memory component (e.g., memory component 238).

The functionality of the modules of FIG. 6 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 6, as well as other components and functions described herein, may be implemented using any suitable means. Such means also may be implemented, at least in part, using corresponding structure as taught herein. For example, the components described above in conjunction with the "module for" components of FIG. 6 also may correspond to similarly designated "means for" functionality. Thus, in some aspects one or more of such means may be implemented using one or more of processor components, integrated circuits, or other suitable structure as taught herein.

The following provides an overview of examples of the present disclosure:

Example 1: A method of a user equipment (UE), comprising: sending first and second emergency call (e-call) requests in parallel to a network through first and second subscriber identity modules (SIMS) of the UE, respectively; receiving first and second e-call success responses through the first and second SIMS, respectively, from the network, the first e-call success response indicating that an e-call connection has been successfully established through the first SIM, and the second e-call success response indicating that an e-call connection has been successfully established through the second SIM; handling an e-call through the first SIM when it is determined that the first e-call success response is received earliest; and handling the e-call through the second SIM when it is determined that the second e-call success response is received earliest.

Example 2: The method of example 1, wherein the first SIM is registered for operation in a first radio access technology (RAT).

Example 3: The method of example 2, wherein the first RAT is 5G New Radio (NR).

Example 4: The method of any of examples 2-3, wherein the second SIM is registered for operation in the first RAT or in a second RAT.

Example 5: The method of example 4, wherein the first RAT is 5G New Radio (NR) and the second RAT is 4G Long Term Evolution (LTE).

Example 6: The method of any of examples 1-5, wherein the first and second e-call requests are first and second internet protocol (IP) multimedia subsystem (IMS) requests, respectively, and wherein the first e-call success response is a first IMS response and/or the second e-call success response is a second IMS response.

Example 7: The method of example 6, wherein the first and second e-call requests are first and second session initiation protocol (SIP) invite messages, respectively, and wherein the first e-call success response is a first SIP OK message and/or the second e-call success response is a second SIP OK message.

Example 8: The method of any of examples 1-7, wherein sending the first and second e-call requests in parallel to the network comprises: establishing a first emergency packet data network (PDN) session through the first SIM; establishing a second emergency PDN session through the second SIM; sending the first e-call request using the first emergency PDN session; and sending the second e-call request using the second emergency PDN session, wherein the first e-call request is sent without waiting for a response to the second e-call request and the second e-call request is sent without waiting for a response to the first e-call request.

Example 9: The method of example 8, wherein the first and second PDN sessions are first and second internet protocol (IP) multimedia subsystem (IMS) PDN sessions, respectively.

Example 10: The method of any of examples 1-9, further comprising: canceling the second e-call request when it is determined that the first e-call success response is received earliest; and canceling the first e-call request when it is determined that the second e-call success response is received earliest.

Example 11: The method of any of examples 1-10, further comprising: detecting an e-call trigger, wherein the first and second emergency call (e-call) requests are sent when the e-call trigger is detected.

Example 12: The method of example 11, wherein the e-call trigger is detected when the e-call is detected on a user interface (UI) of the UE.

Example 13: A user equipment comprising at least one means for performing a method of any of examples 1-12.

Example 14: A user equipment comprising a processor, memory coupled with the processor, wherein the processor is configured perform a method of any of examples 1-12.

Example 15: A non-transitory computer-readable medium storing code for a user equipment comprising a processor, memory coupled with the processor, wherein instructions stored in the memory cause the user equipment to perform a method of any of examples 1-12.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A user equipment (UE), comprising:
a processor;
a memory; and
a transceiver,
wherein the processor is configured to:
send a plurality of internet protocol multimedia subsystem (IMS) emergency call (e-call) requests in parallel via a plurality of subscriber identity modules (SIMs), wherein;
a first e-call request is sent in a first session initiation protocol (SIP) invite message via a first SIM of the UE, wherein the first SIM is registered for operation in a 5G new radio (NR) radio access technology (RAT); and
a second e-call request is sent in a second SIP invite message via a second SIM of the UE, wherein the second SIM is registered for operation in a 4G long term evolution (LTE) RAT;
receive at least one IMS e-call success response, wherein the at least one IMS e-call success response indicates that an e-call connection has been successfully established; and
handle an e-call via a SIM through which the earliest-received e-call success response is received.

2. The UE of claim 1, wherein the first e-call success response is a first SIP OK message and the second e-call success response is a second SIP OK message.

3. The UE of claim 1, wherein in sending the first and second e-call requests in parallel, the processor is configured to:
establish a first emergency packet data network (PDN) session through the first SIM;
establish a second emergency PDN session through the second SIM;
send the first e-call request using the first emergency PDN session; and
send the second e-call request using the second emergency PDN session,
wherein the first e-call request is sent without waiting for a response to the second e-call request and the second e-call request is sent without waiting for a response to the first e-call request.

4. The UE of claim 3, wherein the first and second PDN sessions are first and second internet protocol (IP) multimedia subsystem (IMS) PDN sessions, respectively.

5. The UE of claim 1, wherein the processor is further configured to:
cancel an IMS e-call request that is not sent via the SIM through which the earliest-received e-call success response is received.

6. The UE of claim 1, wherein the processor is further configured to:
detect an e-call trigger,
wherein the processor is configured to send the first and second e-call requests when the e-call trigger is detected.

7. The UE of claim 6, wherein the e-call trigger is detected when the processor detects the e-call on a user interface (UI) of the UE.

8. A method of a user equipment (UE), comprising:
sending a plurality of internet protocol multimedia subsystem (IMS) emergency call (e-call) requests in parallel via a plurality of subscriber identity modules (SIMs), wherein:
a first e-call request is sent in a first session initiation protocol (SIP) invite message via a first SIM of the UE, wherein the first SIM is registered for operation in a 5G new radio (NR) radio access technology (RAT), and
a second e-call request is sent in a second SIP invite message via a second SIM of the UE, wherein the second SIM is registered for operation in a 4G long term evolution (LTE) RAT;
receiving at least one IMS e-call success response, wherein the at least one IMS e-call success response indicates that an e-call connection has been successfully established; and
handling an e-call via a SIM through which the earliest-received e-call success response is received.

9. The method of claim 8, wherein the first e-call success response is a first SIP OK message and the second e-call success response is a second SIP OK message.

10. The method of claim 8, wherein sending the first and second e-call requests in parallel comprises:
establishing a first emergency packet data network (PDN) session through the first SIM;
establishing a second emergency PDN session through the second SIM;
sending the first e-call request using the first emergency PDN session; and
sending the second e-call request using the second emergency PDN session,
wherein the first e-call request is sent without waiting for a response to the second e-call request and the second e-call request is sent without waiting for a response to the first e-call request.

11. The method of claim 10, wherein the first and second PDN sessions are first and second internet protocol (IP) multimedia subsystem (IMS) PDN sessions, respectively.

12. The method of claim 8, further comprising:
canceling an IMS e-call request that is not sent via the SIM through which the earliest-received e-call success response is received.

13. The method of claim 8, further comprising:
detecting an e-call trigger,
wherein the first and second emergency call (e-call) requests are sent when the e-call trigger is detected.

14. The method of claim 8, wherein the e-call trigger is detected when the e-call is detected on a user interface (UI) of the UE.

15. A user equipment (UE) configured to operate in first and second radio access technologies (RATs), comprising:
means for sending a plurality of internet protocol multimedia subsystem (IMS emergency call (e-call) requests in parallel via a plurality of subscriber identity modules (SIMs), wherein;
a first e-call request is sent in a first session initiation protocol (SIP) invite message via a first SIMof the UE, wherein the first SIM is registered for operation in a 5G new radio (NR) radio access technology (RAT) respectively, and
a second e-call request is sent in a second SIP invite message via a second SIM of the UE, wherein the second SIM is registered for operation in a 4G long term evolution (LTE) RAT;
means for receiving at least one IMS e-call success respons, wherein the at least one IMS e-call success response indicates that an e-call connection has been successfully established; and
means for handling an e-call via a SIM through which the earliest-received e-call success response is received.

16. A non-transitory computer-readable medium storing computer-executable instructions for a user equipment (UE), the computer-executable instructions comprising:
one or more instructions instructing the UE to send a plurality of internet protocol multimedia subsystem (IMS) emergency call (e-call) requests in parallel via a plurality of subscriber identity modules (SIMs), wherein;
a first e-call request is sent in a first session initiation protocol (SIP) invite message via a first SIM of the UE, wherein the first SIM is registered for operation in a 5G new radio (NR) radio access technology (RAT); and a second e-call request is sent in a second SIP invite message via a second SIM of the UE, wherein the second SIM is registered for operation in a 4G long term evolution (LTE) RAT;

one or more instructions instructing the UE to receive at least one IMS e-call success response, wherein the at least one IMS e-call success response indicates that an e-call connection has been successfully established; and one or more instructions instructing the UE to handle an e-call via a SIM through which the earliest-received e-call success response is received.

* * * * *